Sept. 1, 1959          G. SMITH          2,902,680
TELEMETERING SYSTEM
Filed Aug. 2, 1954          7 Sheets-Sheet 1
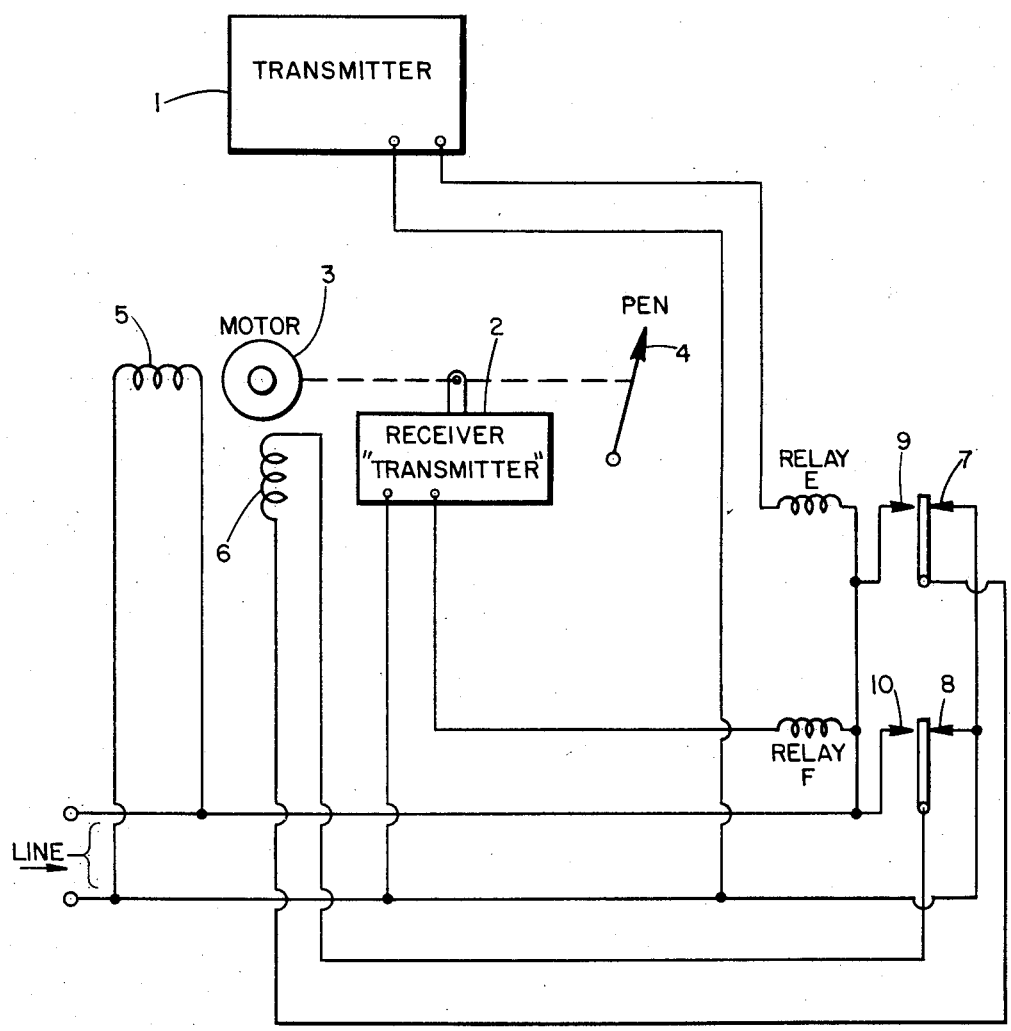
FIG. I
INVENTOR.
GRAYDON SMITH
BY
Curtis, Morris + Safford
ATTORNEYS

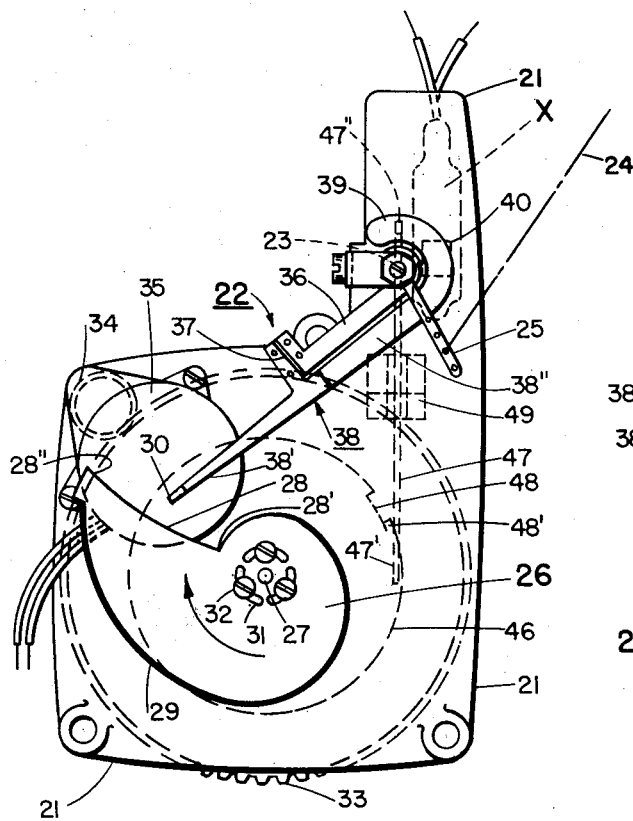

Sept. 1, 1959  G. SMITH  2,902,680
TELEMETERING SYSTEM
Filed Aug. 2, 1954  7 Sheets-Sheet 3
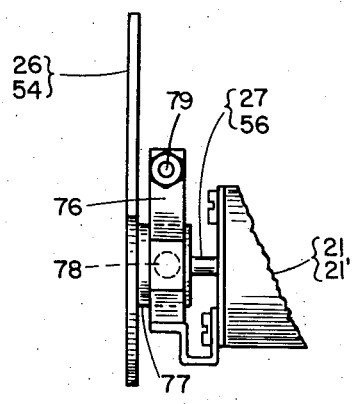
FIG. VI
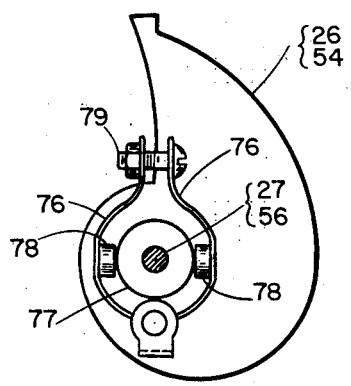
FIG. VII
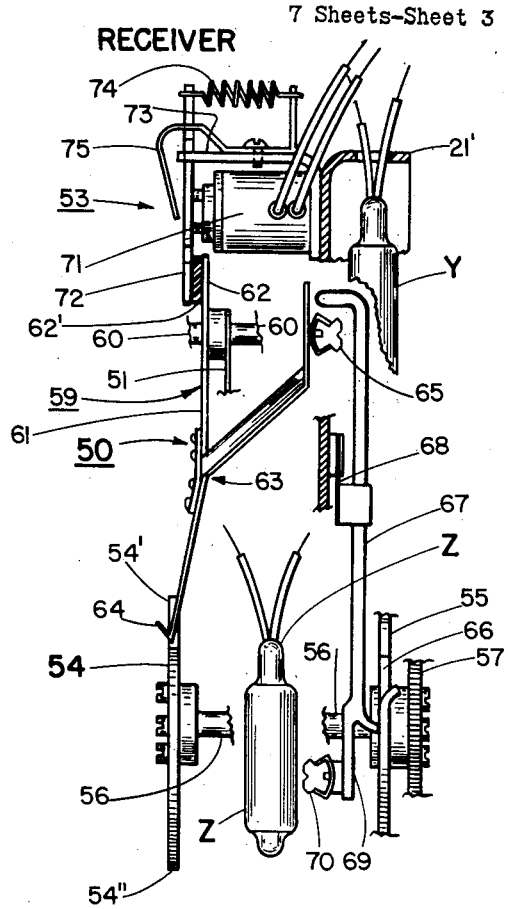
FIG. IV
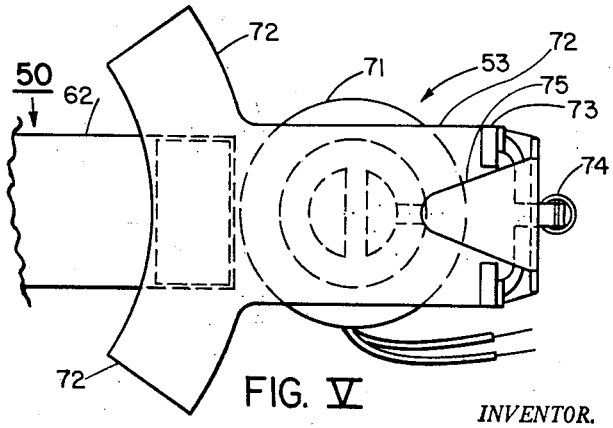
FIG. V
INVENTOR.
GRAYDON SMITH
BY
Curtis, Morris & Safford
ATTORNEYS

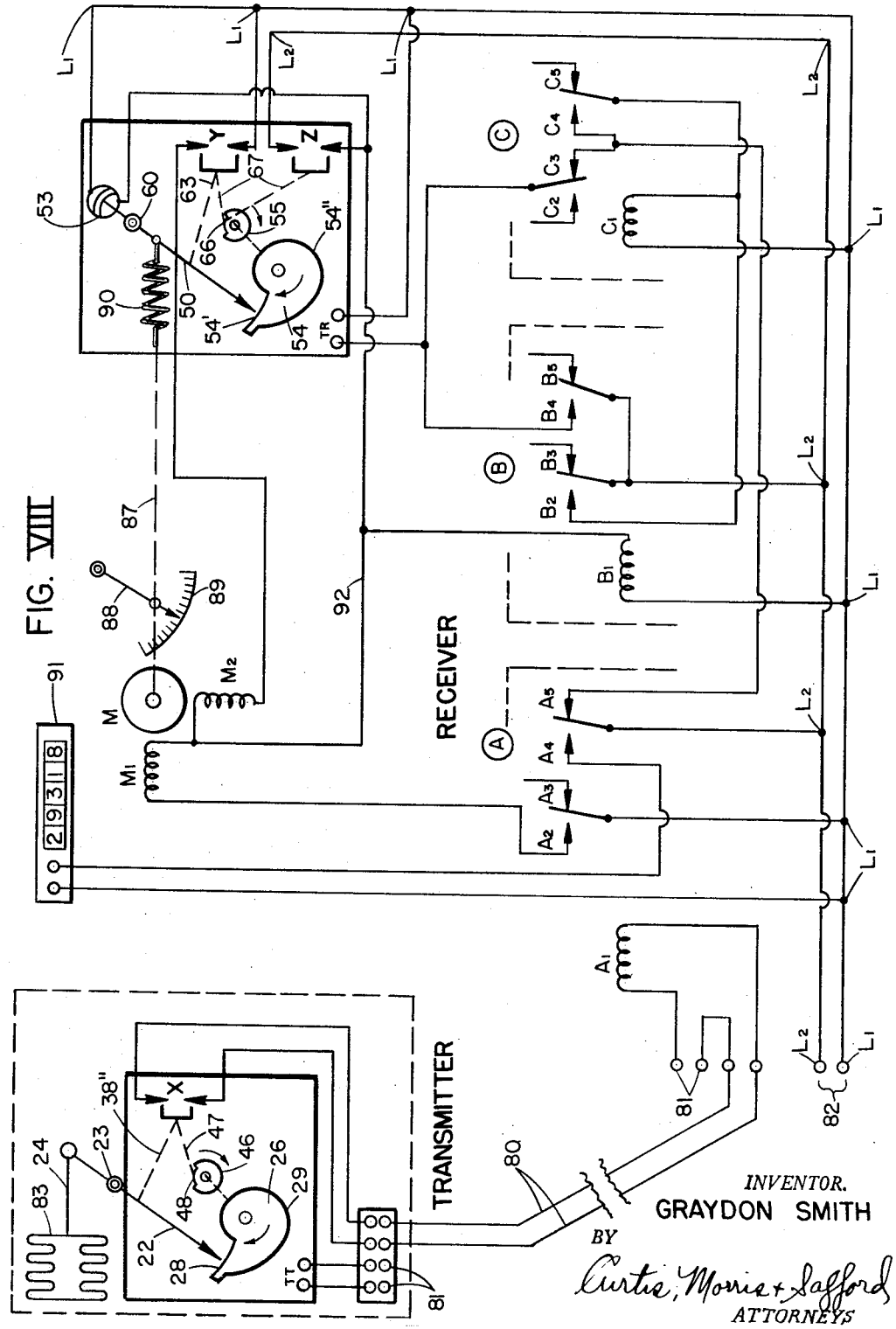

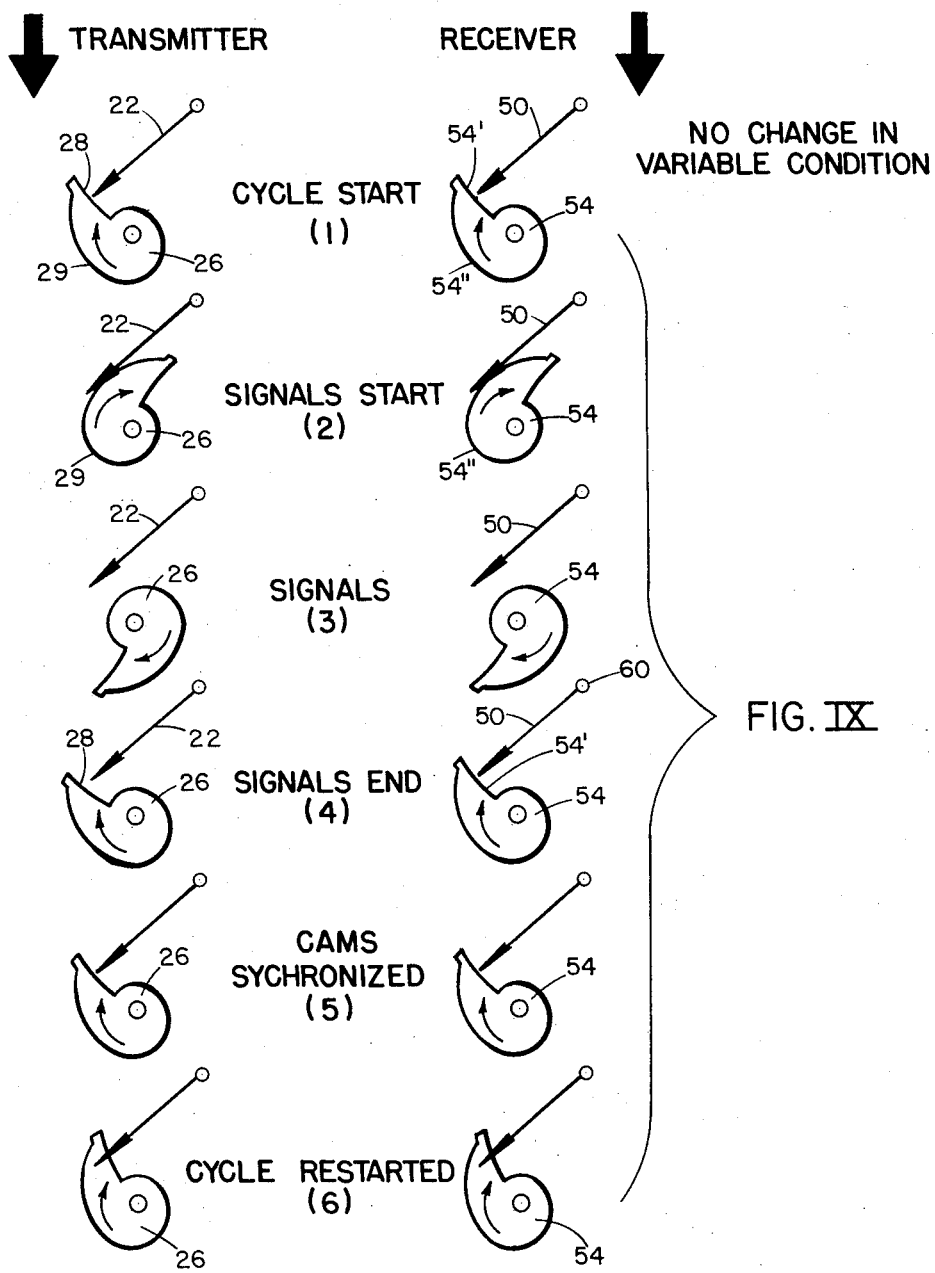

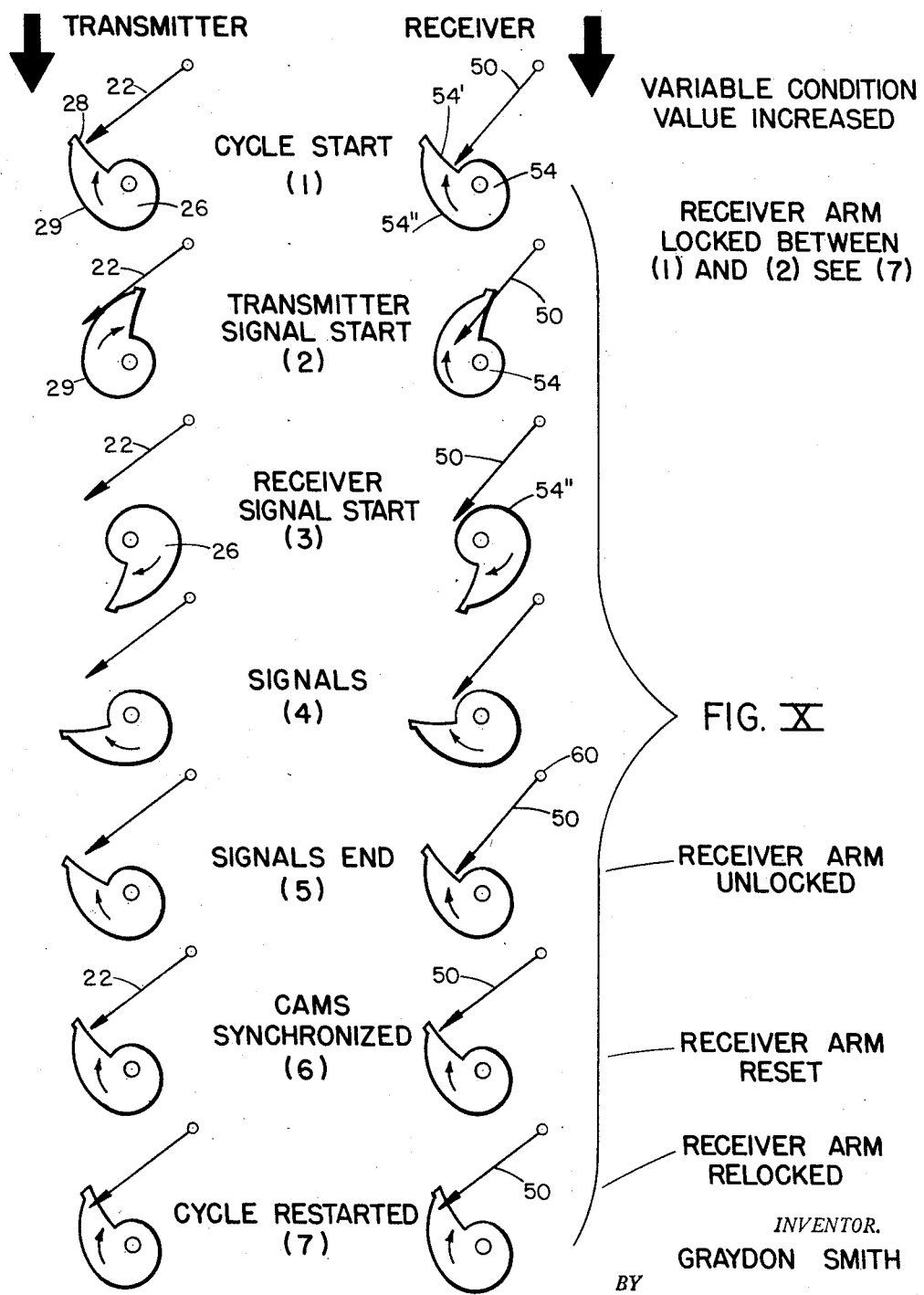

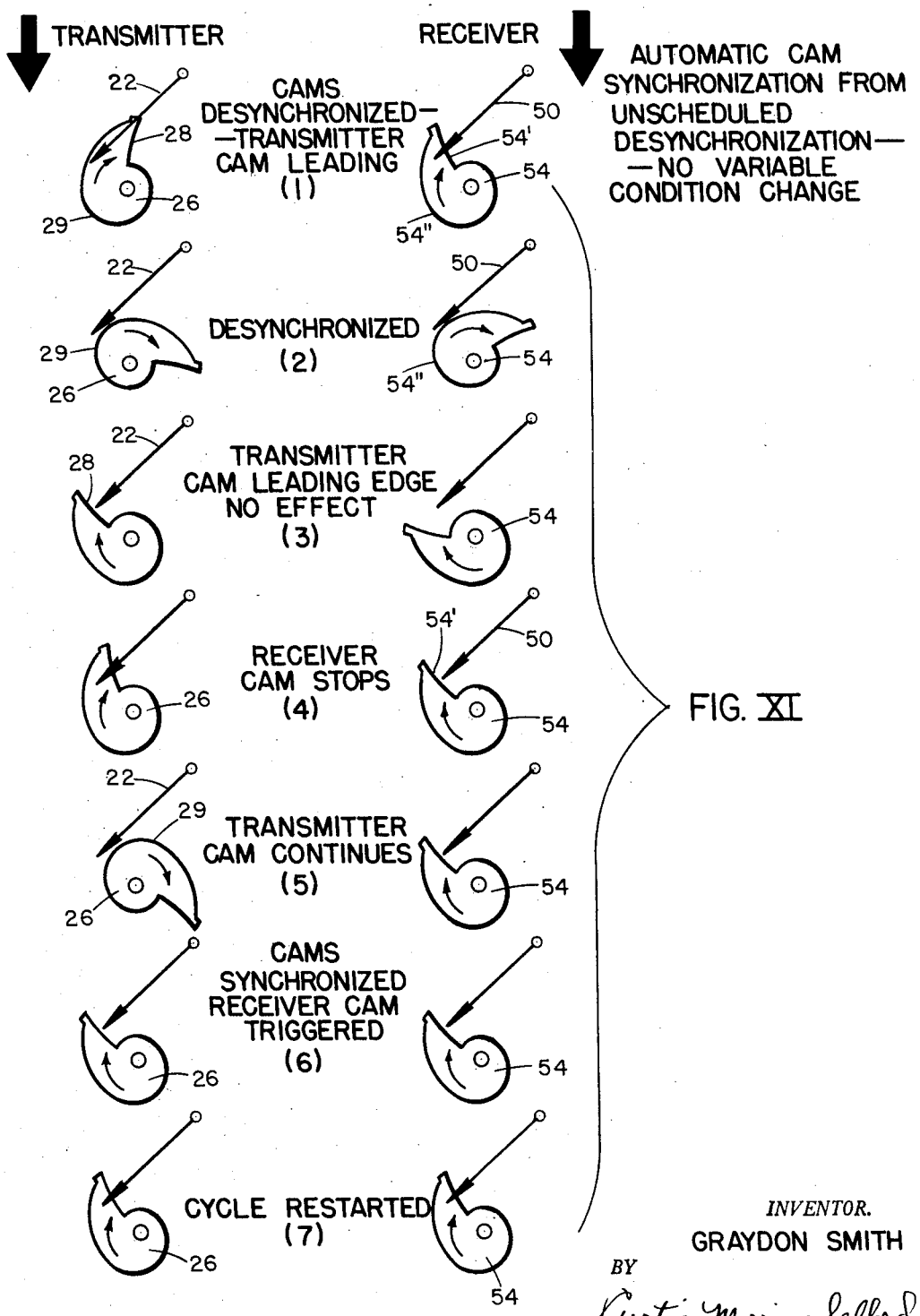

United States Patent Office 2,902,680
Patented Sept. 1, 1959

2,902,680
TELEMETERING SYSTEM

Graydon Smith, Concord, Mass., assignor to The Foxboro Company, Foxboro, Mass., a corporation of Massachusetts Application August 2, 1954, Serial No. 447,066

10 Claims. (Cl. 340—206)

This invention relates to telemetering systems wherein information is transmitted in representation of changes in the values of variable conditions such as temperature, pressure, flow, and the like, and wherein a receiver evaluates such information and operates to indicate, record, or control with respect to such variable conditions. This invention is particularly concerned with such systems, wherein transmitter and receiver actions are similarly produced on a time duration basis, a time duration comparison of these actions made, and the resulting time duration difference utilized as an error signal to indicate, record, or control with respect to the variable condition.

The system of this invention may embody a transmitter and a receiver which have essentially duplicate cam and cam contact arm units with the action of the transmitter and receiver cam and cam contact arm units, for example, being that they each actuate or refrain from actuating electrical circuits in recurring periods of predetermined time duration. In a transmitter mechanism, for example, an electrical contact may be opened and closed on a recurrent cycle. The percentage of time that the contact is closed may be a measure of the value of a variable condition. Thus, if a temperature value is being transmitted, 0° C. might cause the contact to close for zero time, 50° C. might cause the contact to close for three seconds, and 100° C. might cause the contact to close for six seconds. One second might be required for the mechanism to reset itself, in which case the information cycle would be repeated every seven seconds. Certain of these transmitter and receiver time duration periods are automatically compared, to produce an error signal in the form of a time duration difference, if any, representative of a change in a variable condition. This error signal is then used to indicate, record, or control, as desired.

Prior art systems of this nature have involved expensive equipment and mechanisms which are undesirably subject to wear. This invention provides a new and improved telemetering system, substantially less expensive in its equipment requirements, for example, in that its transmission line requirements between transmitter and receiver may be not more than two wires; and this invention also provides new and improved transmitter mechanisms for use in both the transmitter and the "receiver."

Some form of synchronization between the transmitter and receiver cams is often desirable in systems using essentially duplicate transmitter and receiver cam and cam contact arm units. Prior art systems of this nature have used devices which operate on the basis of synchronization of the cams at all times, with expensive three wire electrical connections between the transmitter and receiver as part of the means for providing the cam synchronization.

An embodiment of this invention provides a telemetering system using essentially duplicate transmitter and receiver cam and cam contact arm units with structures and arrangements such that synchronization of the cams is provided automatically upon the occurrence of a predetermined degree of desynchronization, and such that not more than two wires may be required in a transmitter-receiver variable condition signal and synchronization connection. Further, this embodiment of this invention provides new and improved transmitter and receiver structures and arrangements.

In this synchronizing embodiment of this invention as presented herein, these novel structures and arrangements include as a specific illustration similar transmitter and receiver cam and cam contact arm units in a system whose action is isochronous in that one cam is driven faster than the other cam, and this one cam is held back once each cycle while the other cam catches up, in an automatic synchronizing action. Thus, at one point in each cycle, the transmitter and receiver cams are in the same position.

Also, in this synchronizing embodiment of this invention, a single cycle for the transmitter cam may be of the order of seven seconds and is the same in the time duration as a single cycle for the receiver cam. In the specific illustration given herein, rotary cams are used and each cycle involves one revolution of each cam. The transmitter cam cycle is accomplished by continuous cam rotation, but the receiver cycle includes hold-back time during which the transmitter cam catches up, once each cycle. When the transmitter cam catches up, the receiver is triggered by the transmitter to restart the rotation of the receiver cam.

Another feature of this synchronizing embodiment of this invention is that the transmitter and receiver cams may be automatically synchronized from any desynchronized relation within two cycles, that is, in this particular illustration, within two revolutions of the continuously rotating transmitter cam.

A further feature of this embodiment is that the receiver cam contact arm may be held in a predetermined position while the time duration difference error signal is applied thereto as a spring bias. At a particular portion of the receiver cam cycle, the receiver cam contact arm is automatically released and positionally reset in accordance with the error signal.

Another feature of this invention is that it offers an opportunity to carry out certain variable condition combining operational calculations which are not readily performed with prior art telemetering systems.

Still other features of this invention reside in the new and improved structure of the transmitter and receiver units.

It is an object of this invention, therefore, to provide a new and improved telemetering system.

Another object is to provide a novel synchronizing telemetering system.

A further object is to provide new and improved transmitter and receiver units of this type and nature.

These and other objects and features of this invention will be in part pointed out and in part apparent from the text and claims here presented, and from the accompanying drawings, in which:

Figure I is a schematic illustration of a telemetering system embodying this invention;

Figure II is a front elevation of a transmitter cam and cam contact arm unit of this invention;

Figure III is a side elevation, in partial section, of the structure of Figure II;

Figure IV is a fragmentary showing of a receiver cam and cam contact arm unit of this invention, in side elevation and partial section;

Figure V is a fragmentary front view of the structure of Figure IV, in illustration of the receiver cam contact arm magnetic clamp structure;

Figures VI and VII are views of a back-lash preventing friction clamp on a cam drive shaft, for use in either or both the transmitter and receiver;

Figure VIII is a schematic illustration of a synchronizing telemetering system embodying this invention; and Figures IX, X, and XI as related to Figure VIII are cam cycle showings under different operating situations, as identified on each drawing.

In the following specification, the first step is the description of the illustrative embodiment of the telemetering system of this invention in simple form, as shown in Figure I. Thereafter the transmitter and receiver mechanisms and arrangements are presented, as shown in Figures II–VII inclusive. Next, a synchronizing embodiment of a telemetering system according to this invention is set forth, as shown in Figure VIII. Thereafter, a series of cam and cam contact arm relative position sequences is explained, as shown in Figures IX–XI inclusive.

FIGURE I

In the Figure I showing of a telemetering circuit as an embodiment of this invention, two transmitter mechanism units 1 and 2 are used. The transmitter 2 is a receiver section transmitter.

Transmitter unit 1 is used as a transmitter with respect to a variable condition responsive device (not shown) which may be, for example, a bellows for measuring pressure. The whole circuit, excluding the transmitter unit 1, is a receiver circuit, and the transmitter unit 2 therein is operatively connected to a two-phase motor 3 and to a recording pen 4. Two electrical relays E and F are connected to the two transmitter units, so that relay E operates when contacts are closed in transmitter 1, and relay F operates when contacts are closed in transmitter 2.

In the two phase motor 3, one phase 5 is connected across the line, and the other phase 6 is connected through contacts 7 and 8 of the relays E and F respectively. These relays are both shown as unenergized, with contacts 7 and 8 closed and contacts 9 and 10 open. In this condition, no current reaches phase 6 of the motor 3. Similarly, when both relays are energized, i.e., contacts 9 and 10 are closed and contacts 7 and 8 are open, no current reaches phase 6 of the motor 3. However, if relay E operates alone it will cause the motor 3 to run in one direction and if relay F operates alone it will cause the motor 3 to run in the opposite direction. Thus, if the pen 4 is in the correct position to indicate the variable condition signal as applied to transmitter 1, the contacts in both transmitters 1 and 2 will open together and close together. This will cause relays E and F to operate simultaneously, so that they are either both open or both closed.

Now consider that a new variable condition signal is applied to transmitter 1. For purposes of illustration, let us assume that the new signal has a lower value and that it corresponds to a shorter duration of closed contact condition in transmitter 1. In this case, the relays E and F will first operate together to open contacts 7 and 8 and to close contacts 9 and 10. However, relay E will release before relay F. There will thus be an interval of time during which relay E is released, i.e. contact 7 is closed and contact 9 is open, but relay F is not released, i.e., contact 8 is open and contact 10 is closed. This interval will be proportional to the scale distance by which the position of the pen 4 is in error with respect to the value of the new signal as applied to transmitter 1.

Under the above conditions, the motor 3 will rotate until the relay F is released, thus moving the pen 4 a distance proportional to the error. The direction of rotation of the motor 3, under such conditions, will depend on whether the new signal applied to the transmitter 1 is greater or less in value, and consequently, on which relay is released and which relay is held. Accordingly, a change in the variable condition signal as applied to the transmitter 1 will result in an action of the motor 3 of such duration and direction as will bring the pen 4 to the position which represents the value of the new variable condition signal.

As mentioned hereinbefore, this invention is susceptible to arrangements which provide means for performing certain calculations. The transmitter units 1 and 2 may include a cam or other provision for a controlled non-linear response to a variable condition signal. For example, the variable condition signal may be representative of differential pressure across an orifice in a pipe, and in such a case the transmitter unit 1 may be designed so that its closed contact period is proportional to the flow through the pipe. The transmitter unit 2 might be provided with a logarithmic characteristic. With this arrangement an additional variable can be introduced, so that the position of the pen 4 is the product of two factors. Thus when measuring flow, a temperature correction can be introduced. Similarly, two variables such as torque and speed can be combined to read power.

In the system of Figure I it is assumed that both transmitter "integrator" units 1 and 2 are in exact synchronism with operational cycles starting at the same instant. If they are not in synchronism no error will result, but the pen 4 will move back and forth through the true position. If the two mechanisms are operated from the same power source by synchronous motors, they will normally stay in synchronism indefinitely. In such a case, synchronism can be established by adjusting the timing so that the pen 4 does not move back and forth with respect to the true position.

Automatic synchronization is often desirable, and is provided in the structure illustrated in Figure VIII, which is a development of the arrangement of Figure I.

The transmitter

Figures II and III show the structure of a transmitter in an embodiment of this invention. Through the use of this structure, a mercury switch X is held in closed condition for periods of time representative of values of a variable condition such as flow, pressure, temperature, and the like. As an example, this representation may be proportional. The mercury switch X is contained in a housing 21 on which a cam contact arm unit 22 is pivotally mounted on a cam contact arm shaft 23. Movement of the cam contact arm unit 22 about its pivot 23 is produced in response to changes in the above-mentioned variable condition. Such variable condition changes are translated into mechanical movement in any of the well-known methods, not shown, and this mechanical movement is applied to the cam contact arm unit 22 through a mechanical connection 24 and an arm 25.

The transmitter cam contact arm unit 22 operates in association with a side surface contact cam 26 which in the operation of this transmitter is constantly rotated clockwise about the axis of a shaft 27 which is mounted in the housing 21, the shaft 27 being parallel to the cam contact arm pivot shaft 23. The cam 26 is a flat member lying outside the housing 21 in a plane perpendicular to the axis of rotation of its shaft 27. The cam 26 has a leading edge 28 which extends generally, as shown, concentrically with respect to the cam contact unit pivot 23, and a curved trailing edge 29. The trailing edge 29 is characterized in its curvature, for example, logarithmically with respect to radial distance from the center of rotation of the cam. The area of the cam 26 encompasses only a small part of a circle described by its greatest radius. The cam contact arm unit 22, at its free end, has a cam contact finger 30 which is moved toward or away from the cam axis shaft 27 as the cam contact arm unit 22 is pivotally moved on its pivot 23. The cam contact arm contact finger 30 is arranged to engage the under side of the cam 26, that is, the side facing the transmitter housing 21.

Thus as the transmitter cam 26 is constantly rotated, the cam contact arm unit 22 is in engagement therewith during a part only of each cam revolution. The time durations of the "in engagement" and "out of engagement" conditions of the cam 26 and the cam contact arm 22 vary accordingly as the cam contact arm contact finger 30 is positioned by the measured variable condition closer or further from the cam axis shaft 27. The characterized shape of the cam 26 makes the "in engagement" time less as the cam contact arm contact finger 30 is positioned further from the cam axis shaft 27. As the in engagement time is thus made, less, and therefore a smaller part of a single revolution of the cam 26, the out of engagement time naturally is made greater. As will be seen hereinafter, the mercury switch X is closed, except for a small time period of transition, concurrently with the out of engagement condition of the cam 26 and the cam contact arm 22. Conversely, the mercury switch X is open during the time when the cam 26 and the cam contact arm 22 are in engagement.

The transmitter cam leading edge 28 is curved, concentrically with the pivot 23 and on a radius approximating the length of the cam contact arm unit 22. It will be seen hereinafter, however, that the location and configuration of the transmitter cam leading edge 28 needs only to be within general limits. The cam trailing edge 29 is generally spiral in form, continually increasing in radial dimension from the inner end 28' of the cam leading edge 28, and extending around the cam axis shaft 27 to a point adjacent the outer end 28" of the cam leading edge 28. This trailing edge form may be in linear, square root, logarithmic, or in other desired characterization with respect to the variable condition being measured and as effectuated by the lengths of the contact paths of the contact unit 22 on the cam 26. In connection with the assembly of the cam 26 and as a means of providing rotary adjustment of the cam with respect to the cam axis shaft 27, the cam 26 is provided with arcuate slots 31 disposed about the cam axis shaft 27 and concentric therewith, and locking screws 32 are provided in the slots 31 for holding the cam 26 in its adjusted position on the shaft 27. In the operation of the cam 26, it is driven in constant rotation at constant speed, through its axis shaft 27 and gears 33 and 34, from a synchronous electric motor 35.

The cam contact arm unit 22 includes a short arm 36, mounted for pivotal movement with the contact arm pivot shaft 23 in response to changes in the measured variable condition. The free end of the short arm 36 has a flexure mounting 37 thereon. A long cam contact arm 38 is supported at about its lengthwise midpoint by the flexure mounting 37, with the long arm 38 extending in the same general direction as that of the short arm 36. The long arm 38 is thus mounted for pivotal movement about the flexure 37 in a plane perpendicular to the plane of the cam 26. Thus the long arm 38 is mounted for movement in each of two planes which are generally perpendicular to each other. One of these planes is the plane of movement of the cam contact arm unit 22 as a whole with its pivot shaft 23, this plane being generally parallel to the cam 26. The other long arm movement plane is the plane of its movement about its flexure mounting 37 on the short arm 36 and this plane is generally perpendicular to the cam 26. The long arm 38 has a cam contact portion 38' which extends from the flexure 37 toward the cam 26, and which is biased against the cam by the flexure 37 when the contact arm unit 22 and the cam 26 are in engagement. The cam contact finger 30 is on the outer, free end of the cam contact portion 38'. The long arm 38 also has a switch operating portion 38" extending from the flexure 37 toward the pivot shaft 23, terminating in a curved end 39 which extends around the cam contact arm unit pivot shaft 23 on a radius thereof.

When the cam contact arm unit 22 is taken out of engagement with the cam 26 the long arm 38 is pivotally moved about the flexure 37 by the flexure spring bias. This action moves the curved end 39 of the long arm 38 toward the mercury switch X, which is located adjacent the cam contact arm unit pivot shaft 23 and in the path of the movement of the long arm 38 about its flexure mounting 37. A permanent magnet 40 is secured to the curved end 39 of the switch operating portion 38" of the cam follower long arm 38. The mercury switch X is arranged and located so as to be in operative relation with the permanent magnet 40 in any of a series of positions of the magnet about the cam contact arm unit pivot shaft 23 as a center, these positions being achieved as the cam contact arm unit 22 is adjusted about the pivot shaft 23 in response to changes in the measured variable.

The mercury switch X is a common type with a sealed glass housing 41 having a pool of mercury 42 therein, one fixed contact 43 which remains in the mercury, and one movable contact 44 which is drawn into the mercury by the pulling effect of the magnet 40 on a metal plate 45 on the movable contact 44. The movable contact is spring biased to a position out of contact with the mercury 42 when the magnet 40 is moved away from the switch X. The mercury switch X is in a fixed location, but the possible movement of the magnet 40 about the pivot shaft 23 is comparatively small, so that the magnet and the switch remain in operative relation throughout the operating pivotal movement range of the cam contact arm unit 22 with its pivot shaft 23.

The magnet 40 is moved toward the mercury switch X as the trailing edge 29 of the cam 26 is rotated past the cam contact finger 30. The long arm 38 snaps transversely past the cam trailing edge 29 under the influence of its flexure bias, and the mercury switch X is put in closed condition, since the magnet 40 is thus moved toward the switch. Thereafter, the cam 26 continues to rotate, and as the leading edge 28 of the cam again approaches the cam contact finger 30, some means is necessary to snap the long arm 38 away from the mercury switch X against the biasing action of the flexure 37. This action is needed to move the magnet 40 away from the mercury switch X, to put it in open condition, and also to move the cam contact finger 30 back, again transversely past the cam leading edge 28 into a position such that it may engage the under side of the cam 26 as the cam rotation is continued.

In order to snap the long arm 38 away from the mercury switch X, a cam disc 46 is provided in association with a pivoted lever 47. The cam disc 46 is mounted on the cam axis shaft 27 for clockwise rotation with the cam 26 in fixed rotary relation therewith, and the cam disc 46 has a peripheral slot 48 therein. The lever 47 is mounted at about its lengthwise midpoint on a fixed location flexure 49 in the housing 21. One end 47' of the lever is biased against a side surface of the cam disc 46 and arranged to fall into the cam disc slot 48 once each revolution of the cam disc 46. The other end 47" of the lever 47 is associated with the long arm 38 of the cam contact unit at a point adjacent the magnet 40. The leading edge 48' of the cam disc slot 48 and the lever 47 are so related that as the cam 26 and the cam disc 46 rotate together, the lever 47 drops into the cam disc slot 48 just as the cam leading edge 28 is about to reach the cam contact finger 30. At this point in the operation of the transmitter the magnet 40 is close to the mercury switch X, which is therefore in closed condition. As the end 47' of the lever 47 drops into the cam disc slot 48, the other end 47" of the lever 47 is moved, and in this movement it engages and moves the cam contact long arm 38 away from the switch X. The switch X is accordingly put in open condition, and the cam contact finger 30 is again in position to engage the under side of the cam 26. The cam disc slot leading edge 48' is sloped somewhat, to avoid vibration in the cam contact long arm 38 which may result from a completely abrupt drop of the cam disc lever 47. As the cam 26 and cam disc 46 are continued in their rotation, the trailing edge of the cam disc slot 48 kicks the cam disc lever 47 out of the slot 48 so that the lever again rides on the side of the cam disc 46. The mercury switch X is kept in open condition, however, since at this point the engagement of the cam contact finger 30 with the under side of the cam 26 holds the magnet 40 away from the mercury switch X. Thereafter, as the cam 26 continues to rotate and again moves the cam trailing edge 29 past the cam contact finger 30, the magnet 40 is again moved toward the switch X by the flexure 37. The switch X is thus again in closed condition until the cam disc lever 47 again falls into the cam disc slot 48.

Therefore, in the operation of the transmitter, the cam contact arm unit 22 is pivotally positioned with its pivot shaft 23 in accordance with the measured value of a variable condition. Thereafter, as the cam 26 rotates, the cam contact arm unit 22 is in engagement with the cam 26 for a part of the cycle of a single revolution of the cam 26, and is out of engagement with the cam for the remainder of the cycle. The mercury switch X is in closed condition during the most of that part of the cycle wherein the cam contact arm unit 22 is out of engagement with the cam 26. This switch closed condition has a time duration which is in predetermined relation to the measured value of the variable condition as implemented by the cam configuration and the radial position of the cam contact arm unit 22 with respect to the cam 26. The use of this mercury switch closed condition will be apparent later herein, in connection with the discussion of the telemetering system of Figure VIII.

The receiver

Figures IV and V and the schematic showing of Figure VIII illustrate the fact that the receiver cam and cam contact arm "transmitter" unit has much in structure and operation which is essentially identical with the transmitter cam and cam contact arm unit of Figures II and III. The receiver structure has the same general front elevation as shown in Figure II for the transmitter, and the receiver showing of Figure IV is comparable to the transmitter side elevation of Figure III.

The receiver cam and cam contact arm unit has features and arrangements not found in the transmitter. Briefly and generally, and with reference to detailed discussion later herein, these features and arrangements include: a receiver cam contact arm unit 50 which is pivotable through an arm 51 by an error signal motor M, Figure VIII, instead of the measured variable pivotal movement arrangement of the transmitter cam contact arm unit 22, see items 24 and 25, Figure II; two receiver mercury switches Y and Z instead of the single transmitter mercury switch X; and an electromagnetic clamp unit 53 for holding the receiver cam contact arm unit 50 against pivotal movement by the motor M, during a certain part of the receiver cam cycle.

As shown in Figure IV, the receiver has a receiver cam 54 and a receiver cam disc 55 mounted in a housing 21' for rotation together, on a receiver cam axis drive shaft 56. The receiver cam 54 has a generally radial and curved leading edge 54' and a characterized trailing edge 54". A fragment of a drive gear 57 is shown in indication of a cam drive arrangement like that in the transmitter of Figures II and III. The transmitter and receiver cam drive gearings are so related as to provide that the receiver cam 54 be driven slightly faster than the transmitter cam 26 as a step in the procedure of synchronizing the transmitter and receiver cams once each cycle. The receiver cam 54 has essentially the same shape and form as that of the transmitter cam 26. However, the characterization of the trailing edges of the transmitter and receiver cams may be varied as desired. For example, the transmitter cam may be linear and the receiver cam logarithmic. In such cases the cam contact arm units are initially adjusted to radially different cam relations in compensation for the difference in characterization. In any case such adjustment is necessary to compensate for the purposely provided difference in the speeds of rotation of the cams.

As previously mentioned herein, a feature of this invention is that it provides a basis for certain variable condition combining operations, whereby with suitable characterizations of the cams, two or more variables may be combined. For example, flow measurement may be combined with a temperature correction, or two variables such as torque and speed may be combined to produce an action which represents power. Common combining structures and arrangements may be used to provide such combining systems, with these systems based on the structures and arrangements of this invention.

The receiver cam contact arm unit 50 is for the most part a duplicate of the transmitter cam contact arm unit 22. The receiver cam contact arm 50 includes a short arm 59 mounted for movement about a pivot 60 in response to error signals from the receiver motor M, Figure VIII. However, as one different arrangement the short arm 59 has a portion 61 extending from the pivot 60 toward the receiver cam 54, and a clamp portion 62 extending from the pivot 60 away from the cam 54. The clamp portion 62 is provided with a rubber pad 62' as an aid in providing effective clamping action.

A receiver cam contact long arm 63 is flexure mounted on the short arm 59 in duplication of the transmitter cam follower flexure mounting 37 of Figure II. The receiver cam contact long arm 63 is a duplicate of the transmitter long arm 38, with a receiver cam contact finger 64 adjacent the receiver cam 54, and a receiver permanent magnet 65 adjacent the receiver cam contact unit pivot 60. The receiver mercury switch Y is in operative relation with the receiver magnet 65 in accordance with movements of the receiver cam contact long arm 63 about its lengthwise centrally located flexure mounting as a pivot. The receiver switch Y is therefore comparable in function to the transmitter switch X.

The receiver cam disc 55 has a peripheral slot 66 therein. A receiver cam disc lever 67 is flexure mounted at 68 for association with the receiver cam disc 55 and the receiver cam disc slot 66, and for association with the receiver cam contact long arm 63, in duplication of the transmitter cam disc lever 47 arrangement of Figures II and III. However, as another different arrangement, at the cam disc end of the receiver cam disc lever 67, a lever extension 69 is provided, with a second receiver permanent magnet 70 mounted thereon. The second receiver mercury switch Z is in operative relation with the second receiver magnet 70, in accordance with the movements of the receiver cam disc lever 67 about its flexure mounting 68 as a pivot.

The receiver cam disc 55 and lever 67 arrangement is such that when the receiver lever 67 falls into the receiver cam disc slot 66, both mercury switches Y and Z become open. When the receiver lever 67 is kicked out of the receiver cam disc slot 66 by further rotation of the cam disc 55, the second magnet 70 is so moved as to close the second mercury switch Z. However, the first mercury switch Y remains open, as in the transmitter, because of the engagement of the receiver cam 54 and cam contact arm unit 50 at this point.

The first receiver mercury switch Y may be called the receiver action switch, that is, the time duration action produced by the receiver cam and cam follower unit is the operation of this switch. Similarly, the transmitter mercury switch X (Figures II and III) may be called an action switch. The second receiver mercury switch Z may be called a drive switch since it is used, Figure VIII, in a drive control circuit for the rotation of receiver cam 54 during most of the receiver cam cycle.

The receiver electromagnetic clamp unit 53, Figures IV and V, operates on the receiver cam contact arm clamp portion 62, when energized. The clamp unit 53 comprises an electromagnetic coil assembly 71 with a clamp arm 72 extending transversely across one end thereof for clamping engagement with the cam contact arm portion 62. Figure V is a plan view including the clamp arm 72, and showing it in an arcuate form which makes it possible to clamp the receiver cam contact arm 50 at any position in its range of pivotal movement about its pivot 60. The clamp arm 72 is fulcrumed on an end of a clamp unit bracket 73, with a spring 74 urging the clamp arm 72 away from the clamp coil assembly 71, and a stop plate 75 against which the clamp arm 72 is held by the spring 74 when the clamp unit 53 is not energized.

As mentioned also in connection with the transmitter, the uses of these various receiver structures and functions will be discussed hereinafter in connection with the telemetering system of Figure VIII.

A device which may be used in either or both of the transmitter and receiver structures is shown in Figures VI and VII. This is a brake for the cam drive shaft 27 or 56 which is used to prevent backlash and to assure steady, even rotation of the cam 26 or 54 with which it is associated. The device comprises a split bracket 76 of flexible metal, mounted on the housing 21 or 21' and surrounding the cam drive shaft 27 or 56 as the case may be. An arbor 77 is provided on the cam drive shaft and a pair of wooden blocks 78 are mounted on the inside facings of the bracket 76, on opposing sides of the arbor 77. A bolt 79 is used to hold together the split ends of the bracket 76 and to apply the wooden blocks 78 against the periphery of the arbor 77 in a braking pressure arrangement.

*The telemetering system*

Figure VIII is a telemetering system in a schematic showing of an illustrative embodiment of this invention, including the feature of synchronization. This system comprises the transmitter section and the receiver section, as so labelled in the drawing, joined by an electrical connection 80 in the form of a pair of wires. In actual practice these wires may be a public utility leased connection such as telephone wires. Where the transmitter and receiver are many miles apart it is often more practical to lease already existing facilities of this nature rather than install new and separate lines. These are the system information transmitting wires, as distinguished from power supply wires through which power is supplied to operate the cams and various devices in the receiver. In this system, separate power supplies are indicated, preferably 110 volts A.C., one at the transmitter at 81, and one at the receiver at 82. It may be generally noted now for reference later herein, that this system has cam synchronizing means, and that as a connection between the transmitter and receiver sections, not more than the two wires 80 are necessary for both the transmission of variable condition signals and for the operation of the synchronizing means.

The Figure VIII transmitter section includes a schematic showing of the transmitter structure of Figures II and III. This includes the transmitter cam 26 and the cam contact arm 22, with the cam contact arm movable about its pivot 23 in accordance with movement through the mechanical connection 24 from a measured variable, the source of this movement being schematically indicated as a bellows 83. The transmitter mercury switch X is shown, as well as the cam disc 46 and its peripheral slot 48. Mechanical operation connection lines 38″ and 47 are provided in representation of the Figure II cam contact arm portion 38″ and cam disc lever 47 to indicate that the mercury switch X is affected by certain movements of the cam contact arm 22, and by movements of the cam disc lever 47 in its association with the cam disc slot 48. The transmitter power source 81 is terminaled in the transmitter structure at TT as an indication that the cam 26 and cam disc 46 are together driven in rotation from this source.

The whole action of the transmitter, therefore, results in the closing and opening of the mercury switch X for predetermined time periods. The transmitter-receiver connection wires 80 are part of a circuit including the transmitter switch X. Thus when the transmitter switch is closed, which results for most of the time when the cam contact arm 22 is out of engagement with the cam 26, the transmitter-receiver connection wires 80 and the transmitter switch X are in condition to be part of a single energized circuit.

In completion of the circuit of the transmitter switch X and the transmitter-receiver connection wires 80 it may be seen that in the receiver section this circuit includes a relay A, which in turn includes an operating coil $A_1$ in the circuit of the transmitter switch X, and switches $A_2$, $A_3$, $A_4$, and $A_5$. This circuit further includes an electrical source 82, which may be direct current. Over long transmission lines, direct current can be more effective than alternating current, with less capacity and inductive effect. Accordingly, when the transmitter switch X is open, its circuit is deenergized, and the receiver relay A is deenergized. In the system condition as shown in Figure VIII, the transmitter switch X has just been put in open condition through action of the transmitter lever 47 falling into the cam disc slot 48. At this point the transmitter cam leading edge 28 is just about to reach the receiver cam contact arm 22, in the manner previously described herein in relation to Figures II and III. Therefore, in the Figure VIII showing, the receiver relay A is deenergized, relay switches $A_2$ and $A_4$ are open, and relay switches $A_3$ and $A_5$ are closed.

In the Figure VIII receiver section, the receiver structure is schematically shown, according to the structure previously discussed herein in connection with Figures IV and V taken in view of Figures II and III. The receiver cam 54 and receiver cam contact arm 50 are shown, in association with the receiver cam disc 55, the receiver action and drive switches Y and Z, the electromagnetic clamp 53, and the error signal motor M with a mechanical connection 87 to the receiver cam contact arm 50. As in the transmitter section, mechanical operation connection lines 63 and 67 in representation of the Figure IV cam contact long arm 63 and cam disc lever 67 are shown between the receiver cam contact arm 50 and the receiver action switch Y, and between the receiver cam disc slot 66 and each of the receiver action and drive switches Y and Z. Again, these lines are indicative of the fact that certain movements of the receiver cam contact arm 50 affect the receiver action switch Y and that there is an operative relation between the receiver cam disc lever 67, the receiver cam disc slot 66, and both of the receiver mercury switches Y and Z. It may be noted that there is no mechanical operation line directly between the receiver cam contact arm 50 and the receiver drive switch Z, since, as previously discussed herein, the drive switch Z is operated only by the receiver cam disc lever 67. The movements of the receiver cam contact arm 50 do not affect the receiver drive switch Z.

The receiver cam 54 and cam contact arm 50 structure has electrical circuit terminals TR indicative of driving means for rotating the receiver cam 54 and cam disc 55 together as a unit.

The receiver section includes a set of three relays of which the relay A is one, with the others designated as B and C. These relays respond variously as the transmitter and receiver cam and cam contact arm units are operated. Relays B and C are provided respectively with operating coils $B_1$ and $C_1$ and switches $B_2$, $B_3$, $B_4$, $B_5$, and $C_2$, $C_3$, $C_4$, $C_5$. Further, there is in the receiver section a time duration difference error signal arrangement including the motor M which is a two phase reversible electric motor with motor operating coils $M_1$ and $M_2$ for rotating the motor M in one direction or the other. The mechanical error signal transfer connection 87 between the motor M and the receiver cam contact arm 50 includes an indicator arm 88 in association with an indicator scale 89. The connection 87 also includes a coil spring 90 in which rotation of the motor M may establish an error signal. This error signal is in the form of spring bias on the receiver cam contact arm 50 while the receiver cam contact arm 50 is held in a predetermined position by the electromagnetic clamp 53. The spring 90 resets the cam contact arm 50 radially with respect to the cam in accordance with the error signal, when the clamp 53 is released.

A further device presented in the receiver section is a counter unit 91. This counter unit may be any of the common types and, as will be seen hereinafter, is affected only by the action of the transmitter. Therefore, this counter could be used without the receiver cam 54 and cam contact arm 50 structure. That is, the transmitter section and the receiver counter 91 may be used as an integrator. When used as shown in Figure VIII, the entire system combines an integrator system and a telemetering system. Thus the transmitter of this invention is readily usable as a part of an integrator.

In Figure VIII, as will be shown by tracing the circuits later herein, the receiver cam 54 is about at the point of synchronization with the transmitter cam 26, and the receiver action switch Y and the receiver drive switch Z are both in open condition in accordance with the position of the receiver cam disc slot 66. Further, the electromagnetic clamp 53 is deenergized and the receiver cam contact arm 50 is free to be pivoted in resetting action, if any. The reversible motor M is at approximately its operative mid-point with motor coils $M_1$ and $M_2$ both deenergized. Relays A, B, and C are all deenergized with switches $A_2$, $A_4$, $B_2$, $B_4$, and $C_2$, $C_4$, all open. Further, the counter 91 is deenergized.

*Telemetering system operation*

The operation of the system of Figure VIII should be considered in the light of Figures I–V inclusive. As a general recapitulation, the Figure VIII system is a telemetering system with synchronizing arrangements wherein transmitter and receiver actions are similarly produced by essentially duplicate cam and cam contact arm units, on a time duration basis. A time duration comparison of these actions made, and the resulting time duration difference, if any, is utilized as an error signal to indicate, record, or control with respect to a measured variable.

The transmitter section has therein a representation of the transmitter structure of Figures II and III. The receiver section has therein a representation of the receiver structure of Figures IV and V taken in the light of Figures II and III. Further, for purposes of tracing circuits one side of the A.C. line is designated as $L_1$ and the other side of the line as $L_2$.

Very generally, the operation of the Figure VIII system is as follows: The transmitter and receiver cam and cam contact arm positional relations are, as shown, initially essentially the same. Upon the occurrence of a variable condition value change, the transmitter cam contact arm 22 is adjusted radially of its cam in response thereto while the receiver cam contact arm 50 is held in its initial position. The ensuing operation of both cam units causes the receiver reversible motor M to rotate in accordance with a time period representative of the variable condition value change. This action is indicated on the scale 89, and applied to the receiver cam contact arm 50 as a bias in the spring 90. At the end of a cycle the receiver cam contact arm 50 is released and reset according to the spring bias, to a new position in a particular relation to the new position of the transmitter cam contact arm 22.

The transmitter and receiver cams 26 and 54 are rotated together in clockwise direction, generally having the same cycle and rotary position. More specifically, the receiver cam 54 is driven slightly faster than the transmitter cam 26 and the receiver cam 54 is stopped once each cycle while the constantly rotating transmitter cam 26 catches up in a cam rotary position synchronizing procedure. The system is arranged and adjusted so that when there is no variable condition change the receiver motor coils $M_1$ and $M_2$ are simultaneously excited, with the result that the motor M remains stationary. Some of this adjustment is in compensation for the greater speed of the receiver cam.

The cam cycle starting rotary positions for both the receiver and transmitter cams 26 and 54 are herein considered as the cam positions shown in Figure VIII, with the leading edges 28 and 54′ of both cams just about to reach their respective cam contact arms 22 and 50. The time from the start of one revolution to the start of the next revolution is the measure of one cycle for each of the cams. This cycle time may be of the order of seven seconds, and is the same for both the transmitter and receiver cams. The transmitter cam 26 rotates constantly, completing one revolution in seven seconds. The receiver cam 54 completes each revolution in less than seven seconds, and waits the remainder of the seven seconds.

The cycle starting position, Figure VIII, is also the rotary position of cam synchronization. At this point the waiting period of the receiver cam 54 is terminated and the receiver cam restarted. It may be noted again that the cam discs 46 and 55 rotate with their respective cams and the cam disc levers 47 and 67 fall into their respective cam disc slots 48 and 66 just before their respective cam leading edges 28 and 54′ reach their respective cam contact arms.

In preparation for the specific cycle discussions to follow, the various parts of the system will first be reviewed.

The transmitter operates simply to open and close the transmitter mercury switch X. The only direct result of this in the receiver is to energize and deenergize the relay A, since relay coil $A_1$ is in the circuit of the transmitter switch X. As the transmitter cam 26 is rotated to move its trailing edge 29 past the transmitter contact arm 22, switch X becomes closed. Later, as the transmitter cam disc lever 47 falls into the cam disc slot 48, switch X becomes opened. Still later, as the cam disc lever 47 is kicked out of the cam disc slot 48 by further rotation of the cam disc 46, switch X remains open because the cam contact arm 22 is in engagement with the cam 26 at this time. The transmitter rotation is continuous, from power supplied to the terminals TT.

In the receiver, mercury switch Y is comparable in function to transmitter switch X and is operated in the same manner, as above. The receiver mercury switch Z is opened essentially simultaneously with the switch Y as the receiver cam disc lever 67 falls into the receiver cam disc slot 66. However, the receiver switch Z is closed as the cam disc lever 67 is kicked out of the cam disc slot 66 by further rotation of the cam disc 55. The switch Y remains open at this point because of the engagement of the receiver cam contact arm 50 with the receiver cam 54.

The receiver cam rotation is not continuous. It is provided from power supplied to the receiver terminals TR. As will be seen hereinafter, this power is supplied either through relay B, through relays C and A, or not at all, depending on the cam cycle position and the condition of the system. The no power condition occurs once each cycle of the receiver cam 54, during its waiting period. The receiver cam 54 is restarted through relays C and A, and is thereafter powered through most of each cycle through relay B.

The following traces the circuitry of each relay, in preparation for later discussion of the overall operation of the system.

Relay A becomes energized when transmitter switch X is closed:

X—connector line 80—$A_1$

Relay B becomes energized when receiver switch Z is closed:

$$L_1-B_1-Z-L_2$$

Relay C becomes energized when relay B becomes energized:

$$L_1-C_1-B_2-L_2$$

Relay C becomes deenergized when relay B becomes deenergized since $B_2$ becomes open, except:
Relay C remains energized when relay B becomes deenergized, if relay A is at the time in deenergized condition:

$$L_1-C_1-C_4-A_5-L_2$$

The receiver cam 54 is driven when relay B is in energized condition:

$$L_1-TR-B_4-L_2$$

The receiver cam 54 is driven when relays C and A are both in deenergized condition:

$$L-TR-C_3-A_5-L_2$$

The receiver cam 54 stops, because of the action of the lever 67 in dropping into the cam disc slot 66, once each cycle whether the cams are synchronized or not. In normal operation, the receiver cam 54 stops, and its waiting time starts, when the receiver switch Z is opened; and the receiver cam waiting time terminates a little later, when transmitter switch X is opened. The receiver cam stops when switch Z is opened because relay B thus becomes deenergized and switch $B_4$ becomes open. Relay C in this case also becomes deenergized at this time because switch $B_2$ is opened and, as will be seen later herein, relay A is not normally in deenergized condition at this point in the cycle. Thereafter, when transmitter switch X is opened and relay A consequently becomes deenergized, the receiver cam 54 and its cam cycle are restarted through relays C and A:

$$L_1-TR-C_3-A_5-L_2$$

Slightly later, receiver switch Z is closed by the receiver cam disc lever 67 and the relays B and C consequently become energized, so that the receiver cam 54 is powered through relay B:

$$L_1-TR-B_4-L_2$$

and no longer through relay C, since switch $C_3$ is now opened.

In the case of unscheduled desynchronization of the transmitter and receiver cams by a power failure, for example, upon resumption of operation, the receiver cam 54 still stops as usual and waits for the transmitter cam 26 to catch up. If relay A is in energized condition at the time switch Z is opened to stop the receiver cam 54, relay C is not held in energized condition since switch $A_5$ is open. Further, the receiver cam cannot be powered at this time through relays C and A, also because switch $A_5$ is open. If relay A is in deenergized condition at the time switch Z is opened to stop the receiver cam 54, relay C is held in energized condition since switch $A_5$ is closed, but the receiver cam 54 still cannot be powered at this time through relays C and A because in the energized condition of relay C, switch $C_3$ is open.

Thus the only time that the receiver cam 54 can be powered through relays C and A is when relays B and C are in deenergized condition at the time relay A becomes deenergized. This is the point of cam synchronization at the end of the receiver cam waiting period and at the start of a new cycle.

The error signal motor M in the receiver section of Figure VIII is operated in rotation in one direction when coil $M_1$ becomes energized and in the other direction when coil $M_2$ becomes energized. In the situation of the system of Figure VIII there is no indication of change in the measured value of the variable condition, and coils $M_1$ and $M_2$ will be simultaneously energized and thus oppose each other, with the result that the motor M will not rotate in either direction.

The coils $M_1$ and $M_2$ have a common lead 92 which reaches $L_2$ through the switch Z. Therefore, neither coil $M_1$ nor coil $M_2$ can be energized unless switch Z is closed. Assuming switch Z to be closed, coil $M_1$ may be energized through relay A when relay A is energized:

$$L_1-A_2-M_1-\text{common lead } 92-Z-L_2$$

Also, coil $M_2$ may be energized through receiver switch Y:

$$L_1-Y-M_2-\text{common lead } 92-Z-L_2$$

Thus coil $M_1$ is related to transmitter switch X, and coil $M_2$ to receiver switch Y. To energize coil $M_1$, the transmitter switch X and the receiver switch Z must both be closed. To energize coil $M_2$, the receiver switches Y and Z must both be closed. With switch Z closed, when transmitter switch X is closed and receiver switch Y is open, the motor M will be rotated in one direction, and when transmitter switch X is open and receiver switch Y is closed, the reverse. Therefore, when the transmitter cam contact arm 22 has a different cam relation than that of the receiver cam contact arm 50 as occasioned by a variable condition change, the motor M will be rotated as an error function in accordance with the direction and extent of this cam and cam follower relation difference.

The receiver cam contact arm clamp 53 is energized, also, only when receiver switch Z is closed:

$$L_1-\text{clamp } 53-Z-L_2$$

Thus the receiver cam contact arm 50 is clamped throughout the receiver cam cycle, except for a period consisting of the receiver cam waiting time plus the time involved while the receiver cam disc lever 67 is travelled peripherally in and along the receiver cam disc slot 66 after the receiver cam 54 is restarted. This unclamped period is the reset period during which the receiver cam contact arm 50 may be moved to a new position in accordance with the error signal spring bias on the receiver cam contact arm 50.

The receiver counter unit 91 is energized only when relay A is energized:

$$L_1-\text{counter } 91-A_4-L_2$$

It may again be noted that the counter 91 relates only to the transmitter and that the transmitter and the counter may be used together as an integrator, without reference or connection to the other portions of the receiver.

FIGURE IX CAM CYCLE
NO CHANGE IN VARIABLE CONDITION

The cam cycle showing of Figure IX is of simple cam and cam contact arm relations. Therefore, this single revolution cycle should be considered in the light of the system of Figure VIII, the structures of Figures II–V inclusive, and the previous discussions herein.

It may be noted again that the transmitter cam 26 rotates continuously and clockwise, while the receiver cam 54 rotates in the same direction and faster than the transmitter cam 26, and that the receiver cam 54 is stopped once each cycle to allow the transmitter cam 26 to catch up, in a cam synchronizing action.

Item (1), Figure IX, shows the transmitter and receiver cams 26 and 54 in rotary synchronized positions which are the same as those shown in Figure VIII. Thus the entire system at item (1), Figure IX, is in the condition shown in Figure VIII. Item (1), Figure IX, may be considered as the cam cycle starting point, that is, the point of cam synchronization. Since in the Figure IX situation there is no change in the variable condition, the cam contact arms 22 and 50 are in essentially the same radial positions in relation to their respective cams 26 and 54. Not shown are certain allowances and cam contact arm radial adjustments made in differencing these cam contact arm positions in view of the greater speed of the receiver cam 54 and the need to hold the receiver motor M stationary by energizing motor coils $M_1$ and $M_2$ simultaneously when there is no change in the variable condition.

At item (1), Figure IX, relays A, B, and C are all in deenergized condition, and the receiver cam 54 is driven through relays C and A, see Figure VIII:

$$L_1—TR—C_3—A_5—L_2$$

Between items (1) and (2), at the position of item (6), switch Z becomes closed as the receiver cam disc lever 67 is kicked out of the receiver cam disc slot 66, and relays B and C consequently become energized. The energizing of relay C opens switch $C_3$ and the receiver cam 54 can no longer be driven through relays C and A. Thereafter the receiver cam 54 is driven through relay B:

$$L_1—TR—B_4—L_2$$

until item (4) is reached and switch Z is thereupon again opened, as the receiver cam disc lever 67 falls into the receiver cam disc slot 66, with the result that the receiver cam 54 is stopped.

The receiver cam contact arm clamp 53, at item (1), Figure IX, is in deenergized condition, and becomes energized between items (1) and (2) at about the position of item (6), as a result of the closing of switch Z at that point.

Item (2), Figure IX, shows the cams 26 and 54 with their respective trailing edges 29 and 54″ rotated just past their respective cam contact arms 22 and 50. At this point the "signals" start, that is, transmitter switch X and receiver switch Y are simultaneously closed by their respective cam contact arms 22 and 50. At this point the receiver switch Z is still in closed condition since the receiver cam disc slot 66 has not yet reached the receiver cam disc lever 67; relay A becomes energized as switch X is closed; and therefore motor coils $M_1$ and $M_2$ simultaneously become energized. Consequently, the motor M is not rotated and there is no error signal.

The counter unit 91 becomes energized at item (2), Figure IX, when switch X becomes closed with the consequence that relay A is energized and switch $A_4$ is closed. The counter unit remains in energized condition until item (5), when switch X is opened as the transmitter cam disc lever 47 falls into the transmitter cam disc slot 48.

Item (3), Figure IX, simply shows the cams 26 and 54 in a later "signals" position in the cycle, with the receiver cam 54 slightly ahead of the transmitter cam 26, and the cam contact arms 22 and 50 out of engagement with their respective cams. At this point switches X, Y and Z are still closed, and the receiver motor coils $M_1$ and $M_2$ are still energized.

Item (4), Figure IX, shows the cams 26 and 54 at "signals end" position, that is, at the point where the receiver cam disc lever 67 falls into the receiver cam disc slot 66. As a result the receiver switch Z is opened, relays B and C become deenergized, and the receiver cam rotation is stopped. The receiver cam 54 cannot continue in rotation on power through relays C and A, since at this point relay A is still energized and switch $A_5$ is open. The common lead 92 to the motor M is broken as switch Z is opened, and both motor coils $M_1$ and $M_2$ are thus deenergized simultaneously. Therefore, even though the transmitter switch X is still closed, it no longer affects the motor coil $M_1$. At this point the receiver cam leading edge 54′ is just about to reach the receiver cam contact arm 50, while the transmitter cam leading edge 28 has yet some distance to travel before it reaches the transmitter cam contact arm 22. This point, item (4), is the start of the receiver cam waiting period.

The receiver cam contact arm clamp 53 becomes deenergized at item (4), Figure IX, as a result of the opening of switch Z. The receiver cam follower 50 thus becomes free for resetting movement about its pivot 60, and this condition lasts until item (6) is reached and switch Z is again closed. In this Figure IX situation, however, there is no resetting of the receiver cam contact arm 50 since there has been no variable condition change.

Item (5), Figure IX, shows that the receiver cam 54 has waited for the transmitter cam 26, and that the transmitter cam has at this point caught up with the receiver cam. The transmitter cam disc lever 47 has fallen into the transmitter cam disc slot 48, and consequently transmitter switch X has been opened. As a result, relay A becomes deenergized and since relay C is in deenergized condition at this point, the receiver cam rotation is restarted, the cam 54 being driven temporarily through relays C and A, switches $C_3$ and $A_5$.

Item (6), Figure IX, shows that the cam cycle has been restarted. The cams 26 and 54 are shown in the approximate rotary positions at which their respective cam disc levers 47 and 67 are kicked out of their respective cam disc slots 48 and 66 by the further rotation of the cam discs. In the transmitter this action has the effect only of moving the cam disc lever 47 out of the way so that switch X may be closed later in the cycle. In the receiver a similar effect is provided in relation to switch Y, and in addition, receiver switch Z is again closed. The closing of switch Z at this point again transfers the cam driving circuit from relays C and A to relay B.

FIGURE X CAM CYCLE
VARIABLE CONDITION VALUE INCREASED

In this situation the operation and action of the entire system is the same as in Figure IX, except in the effect produced by the variable condition value increase. Again, this cycle should be considered in the light of the system of Figure VIII, the structures of Figures II–V inclusive, and the previous discussions herein.

At item (1) the entire system is in the Figure VIII condition, except for the new positions of the cam contact arms 22 and 50 and a new position, not shown, of the indicator 88. The transmitter cam contact arm 22 has been moved radially outward with respect to the transmitter cam 26 in a representation of a variable condition value increase. The receiver cam contact arm 50 has been arbitrarily moved radially inward with respect to the receiver cam 54 in order to more clearly show the action in this situation and is, of course, a representation of the approximate position of the transmitter cam contact arm in this particular situation prior to the variable condition value increase.

Between items (1) and (2) at about the position of item (7), the receiver cam contact arm 50 becomes locked by the electromagnetic clamp 53:

$$L_1—\text{clamp } 53—Z—L_2$$

This is the result of the completion of the clamp circuit when switch Z is closed by the receiver cam disc lever 67 as this lever is kicked out of the receiver cam disc slot 66 by the rotation of the cam disc 55.

Item (2), Figure X, shows the transmitter cam trailing edge 29 just past the transmitter contact arm 22 while the receiver cam 54 and contact arm 50 are still in engagement. At this point the transmitter switch X becomes closed, thereby energizing the relay A with the result that the motor coil $M_1$ becomes energized, receiver switch Z being in closed condition:

$$L_1—A_2—M_1—92—Z—L_2$$

Motor coil $M_2$ is not in energized condition at this point, since receiver switch Y is in open condition, and therefore, the motor M is rotated in one direction under the influence of coil $M_1$ alone. As the motor M is thus rotated, an error signal biasing force is built up in the error signal spring 90 and the indicator 88 is moved in representation of the rotation of the motor M. The receiver cam contact arm 50 is in clamped condition, and is not moved by the error signal at this point.

Item (3), Figure X, shows the receiver cam trailing edge 54″ just past the receiver cam contact arm 50 after the transmitter contact arm 22 has been out of engagement with the transmitter cam 26 for a period of time representative of the difference in radial positions of the transmitter and receiver cam contact arms 22 and 50. At item (3) the receiver switch Y becomes closed, with the result that motor coil $M_2$ becomes energized:

$$L_1-Y-M_2-92-Z-L_2$$

The effect of the energization of coil $M_1$ is thus counteracted at this point and the rotation of motor M is consequently stopped. Thereafter, the cam cycles continue as in Figure IX with item (4), Figure X, comparable to item (3), Figure IX.

At item (5), Figure X, the receiver cam contact arm 50 is released by the clamp 53 upon the opening of switch Z, and thereafter the receiver cam contact arm is reset about its pivot 60 by the spring 90. Item (6) shows that the cam contact arms 22 and 50 are thus brought into a positional relation with respect to each other which is similar to their relation prior to the variable condition change. This reset action is in accordance with the error signal bias previously built up in the error signal spring 90 by the rotation of the motor M under the influence of motor coil $M_1$ alone.

It may be noted here that the cam contact arm clamp 53 is in deenergized condition from item (5), Figure X, to item (7). This coincides with the time during which switch Z is in open condition. Therefore, the receiver cam contact arm 50 is free for resetting action throughout this same period, although for convenience of illustration, Figure X shows the resetting action as completed at item (6).

In the event of a decrease in the variable condition value, the above action is reversed in that the receiver cam trailing edge 54″ passes the receiver cam contact arm 50 while the transmitter cam 26 and cam contact arm 22 are still engaged, with the result that motor coil $M_2$ becomes energized before the coil $M_1$ becomes energized, the motor M is rotated in the opposite direction, and the spring 90 is oppositely biased, in relation to the situation of Figure X.

FIGURE XI CAM CYCLE AUTOMATIC CAM SYNCHRONIZATION FROM UNSCHEDULED DESYNCHRONIZATION — NO VARIABLE CONDITION CHANGE

Again, this cycle should be considered in the light of the system of Figure VIII, the structures of Figures II–V inclusive, and the previous discussions herein.

In this situation the operation and action of the entire system is the same as in Figure IX, except that this is a cam synchronization cycle from a condition of unscheduled desynchronization. Even in normal operation, there is a scheduled desynchronization once each cycle. In normal operation, while the cams start off in rotation together from the item (1), Figure VIII, position, the receiver cam 54 is traveling faster than the transmitter cam 26, and the cams become desynchronized.

Unscheduled desynchronization is the condition wherein the cams are more than normally out of synchronization. For example, a power failure might stop the receiver cam 54 while the transmitter cam 26 was kept rotating. In the system of Figure VIII as an embodiment of this invention, resumption of the power results in automatic synchronization of the cams within one cycle of the receiver cam 54 and two cycles of the transmitter cam 26.

Item (1), Figure XI, shows the cams in positions of extreme desynchronization in a situation of no variable condition change, that is, the radial positions of the cam contact arms 22 and 50 are essentially the same. Both cam contact arms are in engagement with their respective cams, and the transmitter cam leading edge 28 is ahead of the receiver cam leading edge 54′. In normal operation this condition never occurs since the receiver cam 54 rotates slightly faster than the transmitter cam 26 and the cams are synchronized once each cycle.

In the Figure XI situation, the ordinary effects of the cam cycles are not of concern since they have no real meaning with respect to the variable condition during the unscheduled synchronizing action. For example, the motor M may be rotated one way or another, but this rotation is not significant.

At item (1), Figure XI, the cause of the unscheduled desynchronization has been removed, and the system is again in operation. The transmitter cam 26 is in continuous rotation, as usual, and the position of the receiver cam 54 is such that the receiver cam is being driven through the Figure VIII relay B.

At item (1), Figure XI, therefore, in relation to Figure VIII, the system is in the following situation:

Transmitter switch X _____ Open.
Relay A _____ Deenergized.
Receiver switch Y _____ Open.
Receiver switch Z _____ Closed.
Relay B _____ Energized.
Relay C _____ Energized.

The condition of the receiver clamp, the reversible motor M, and the counter unit, is not pertinent during the synchronizing action of this Figure XI situation.

At item (2), Figure XI, the receiver cam 54 has gained somewhat on the transmitter cam 26, and both cams have moved their trailing edges 54″ and 29 beyond their respective cam contact arms 50 and 22. Transmitter switch X and receiver switch Y consequently have become closed but this condition does not affect the synchronizing action at this point.

At item 3, Figure XI, the leading edge 28 of the transmitter cam 26 has just about reached the transmitter cam contact arm 22. This means that the transmitter cam disc lever 47 has fallen into the cam disc slot 48, thereby opening the transmitter switch X. In normal operation this action restarts the receiver cam 54 at the beginning of a new cycle. In this case, however, at item (3), the receiver cam 54 is already being driven, and the opening of switch X has no pertinent effect at this point.

At item (4), Figure XI, in the continued rotation of both cams, the leading edge 54′ of the receiver cam 54 has just about reached the receiver cam contact arm 50. This means that the receiver cam disc lever 67 has fallen into the cam disc slot 66, thereby opening the receiver switches Y and Z. The opening of switch Y relates to the motor M and has no pertinent effect at this point. The receiver cam rotation is stopped, however, by the opening of switch Z, since relay B is thereby deenergized and switch $B_4$ consequently opened. The receiver cam rotation is not continued through relays C and A at this point because relay C in this particular case remains energized although relay B becomes deenergized. This is the case since at item (4) the relay A is in deenergized condition as a result of the position of the transmitter cam 26. Therefore, relay C is held in energized condition.

$$L_1-C_1-C_4-A_5-L_2$$

Consequently switch $C_3$ is open and the receiver cam 54 cannot be driven through relay C at this point.

At item (5), Figure XI, it may be noted that the receiver cam 54 remains in the same position as item (4) while the transmitter cam 26 has continued its rotation. The only action between items (4) and (5) is that the transmitter cam trailing edge 29 has again passed the transmitter contact arm 22. The result is that the transmitter switch X is again closed. Relay A is therefore energized and the opening of switch $A_5$ deenergizes relay C. But power to drive the receiver cam 54 through relays C and A is still blocked, this time in relay A by the open switch $A_5$. Consequently, the receiver cam 54 still remains stationary while the transmitter cam 26 continues to rotate.

At item (6), Figure XI, the normal condition obtains, wherein the transmitter cam 26 catches up with the receiver cam 54 and in so doing restarts the receiver cam rotation. Just prior to item (6) the relay C is in deenergized condition and the relay A is in energized condition. At item (6) the transmitter cam disc lever 47 has fallen into the cam disc slot 48, thereby opening transmitter switch X and deenergizing relay A. The receiver cam rotation is thereby restarted:

$$L_1—TR—C_3—A_5—L_2$$

At item (7), Figure XI, the cams 26 and 54 are again in normal operation, identical with item (6) of Figure IX.

It may be noted in Figure XI that from the extreme desynchronization of item (1) to the synchronization of item (6), the receiver cam 54 rotates through less than one cycle, and the transmitter cam 26 rotates through less than two cycles.

Therefore, automatic cam synchronization occurs within two cycles in the operation of the system from any positions of cam desynchronization. In each case the receiver cam 54 simply rotates until its cam disc lever 67 falls into the cam disc slot 66. The consequent opening of switch Z is controlling in stopping the rotation of the receiver cam 54, which thereafter waits for the transmitter cam 26 to catch up with and restart the receiver cam 54 to start a new, normal cycle.

This invention, therefore, provides an improved telemetering system and an embodiment thereof which uses similar transmitter and receiver cam and cam follower units, wherein variable condition and cam synchronization signals are transmitted through a transmitter-receiver electrical connection which may comprise not more than two wires, wherein the receiver cam is traveled faster than the transmitter cam and held back once each cycle in a cam synchronizing action, wherein the cams are automatically synchronized within two cycles from any positions of desynchronization; and wherein improved transmitter and receiver structures are provided.

As many embodiments may be made in the above invention, and as many changes may be made in the embodiments above described without departing from the spirit and scope of the invention as described herein and shown in the accompanying drawings, it is to be understood that all matter hereinbefore set forth or shown in the accompanying drawings is to be interpreted as illustrative only and not in a limiting sense.

I claim:

1. A receiving device for producing actions on a time duration basis, comprising a cyclically driven cam, a cam contact arm variably positionable with respect to said cam, a reversible motor for variably positioning said cam contact arm, indicator means directly driven by said motor, a mechanical spring bias error signal connection between said motor and said cam contact arm, and a clamp for holding said cam contact arm in one position with respect to said cam during a predetermined part of each cycle of said cam.

2. A telemetering system of the type wherein transmitter and receiver actions are similarly produced on a time duration basis and a time duration comparison of these actions is made, comprising a pair of similar cam and cam contact arm action producing units, one of said units being in a transmitter and the other being in a receiver, circuit means for interconnecting said transmitter and receiver to send time-duration signals therebetween, said transmitter unit having a transmitter cam, a transmitter cam contact arm unit including an arm variably positionable with respect to said transmitter cam, a flexure mounting on said arm, and a second arm mounted on said flexure, said second arm having a transmitter cam engaging portion under the spring bias of said flexure and a switch actuating portion operable as said second arm engages and disengages said transmitter cam, and an electrical switch operable by said switch actuating portion of said second arm, means for cyclically driving the cams of said units with one of said cams driven faster than the other, and means for regularly and automatically synchronizing said cams.

3. A telemetering system of the type wherein transmitter and receiver actions are similarly produced on a time duration basis and a time duration comparison of these actions is made, comprising a pair of similar cam and cam contact arm action producing units, one of said units being in a transmitter and the other being in a receiver, circuit means for interconnecting said transmitter and receiver to send time-duration signals therebetween, said receiver unit including a cyclically movable receiver cam, a receiver cam contact arm variably positionable with respect to said receiver cam, a reversible motor for variably positioning said receiver cam contact arm, a mechanical spring bias error signal connection between said motor and said receiver cam contact arm, and a clamp for holding said receiver cam contact arm in one position with respect to said receiver cam during a predetermined part of each cycle of said receiver cam, means for cyclically driving the cams of said units with one of said cams driven faster than the other, and means for regularly and automatically synchronizing said cams.

4. A telemetering system of the type wherein transmitter and receiver actions are similarly produced on a time duration basis and a time duration comparison of these actions is made, comprising a pair of similar cam and cam contact arm action producing units, one of said units being in a transmitter and the other being in a receiver, circuit means for interconnecting said transmitter and receiver to send time-duration signals therebetween, said transmitter unit comprising a transmitter cam, a transmitter cam contact arm unit including an arm variably positionable with respect to said transmitter cam, a flexure mounting on said arm, and a second arm mounted on said flexure, said second arm having a transmitter cam engaging portion under the spring bias of said flexure and a switch actuating portion operable as said second arm engages and disengages said transmitter cam, and an electrical switch operable by said switch actuating portion of said second arm, said receiver unit comprising a cyclically movable receiver cam, a receiver cam contact arm variably positionable with respect to said receiver cam, a reversible motor for variably positioning said receiver cam contact arm, a mechanical spring bias error signal connection between said motor and said receiver cam contact arm, and a clamp for holding said receiver cam contact arm in one position with respect to said receiver cam during a predetermnied part of each cycle of said receiver cam, means for cyclically driving the cams of said units with one of said cams driving faster than the other, and means for regularly and automatically synchronizing said cams.

5. A telemetering system comprising, in combination, a transmitter and a receiver unit, first and second rotatable cam-like members for said transmitter and receiver units respectively, first and second movable sensing elements associated with said first and second members respectively, each of said elements including a pivoted contact arm engageable under spring tension with a face of the respective rotatable member, said first element being positionable in accordance with the value of a variable condition, first switch means under the control of said first element for producing a first signal having a time duration in accordance with the time duration of engagement between said first element and said first member, second switch means under the control of said second element for producing a second signal having a time duration in accordance with the time duration of engagement between said second element and said second member, control means responsive to the difference in time durations of said first and second signals and arranged to position said second element with respect to said second member in such a manner as to maintain said time duration difference substantially equal to zero, first and second drive means for rotating said first and second members with said second member normally rotating at a faster speed than said first member, third switch means for periodically interrupting the power to said second drive means and thereby to decrease the rotating speed of said second member to below the speed of said first member, a lever actuating device rotatable with said second member, a control lever associated with said device and movable thereby into a control position for a short period of time once each rotational cycle of said second member, said control lever being arranged when in said control position to operate said third switch means and to lift said second element away from and out of engagement with the face of said second member, and means controlled by said transmitter signal for re-establishing the normal drive speed for said second member after said first and second members are synchronized in predetermined positions relative to one another.

6. A telemetering system comprising, in combination, a transmitter and a receiver unit, a signal transmission circuit connecting said transmitter and receiver units, means for producing a flow of current through said transmission circuit, first and second rotatable members for said transmitter and receiver units respectively, first and second drive means for rotating said first and second members with said second member normally rotating at a faster speed than said first member, first and second movable sensing elements operatively associated with said first and second members respectively, said first element being positionable with respect to said first member in accordance with the value of a variable condition, first electric circuit means under the joint control of said first element and said first member for periodically altering said flow of current to produce in said transmission circuit a first signal having a time duration in accordance with the positioning of said first element with respect to said first member, second electric circuit means under the joint control of said second element and said second member for producing a second signal having a time duration in accordance with the positioning of said second element with respect to said second member, control means responsive to said first and second signals and arranged to position said second element with respect to said second member in such a manner as to maintain a predetermined relationship between said first and second signals, means for periodically decreasing the rotating speed of said second member to below the speed of said first member, and means responsive to the alteration of said flow of current by said first electric circuit means, said last-named means being operative to re-establish the normal drive speed for said second member after said first and second members are synchronized in predetermined positions relative to one another.

7. A telemetering system comprising, in combination, a transmitter and a receiver unit, a signal transmission circuit connecting said transmitter and receiver units, means for producing a flow of current through said transmission circuit, first and second rotatable cam-like members for said transmitter and receiver units respectively, first and second drive means for rotating said first and second members with said second member normally rotating at a faster speed than said first member, first and second movable sensing elements engageable respectively with said first and second members during a portion of the rotational cycles thereof, the time duration of engagement for each rotational cycle of said members being determined by the relative positioning of said elements and said members respectively, said first element being positionable with respect to said first member in accordance with the value of a variable condition, first electric circuit means under the joint control of said first element and said first member and operable to alter the flow of current through said transmission circuit to produce in said transmission circuit a first signal having a time duration in accordance with the time duration of engagement of said first element with said first member, second electric circuit means under the joint control of said second element and said second member for producing a second signal having a time duration in accordance with the time duration of engagement of said second element with said second member, control means responsive to said first and second signals and arranged to position said second element with respect to said second member in such a manner as to maintain the time duration of said second signal substantially equal to the time duration of said first signal, means for periodically decreasing the rotating speed of said second member to below the speed of said first member, said last-named means being actuable at the end of a normal rotational cycle of said second rotatable member, and means responsive to the alteration of said current flow by said first electric circuit means and arranged to re-establish the normal drive speed for said second member after said first and second members are synchronized in predetermined positions relative to one another.

8. A telemetering system comprising, in combination, a transmitter and a receiver unit, a signal transmission circuit connecting said transmitter and receiver units, means for producing a flow of current through said transmission circuit, first and second rotatable cam-like members for said transmitter and receiver units respectively, first and second drive means for rotating said first and second members with said second member normally rotating at a faster speed than said first member, first and second power circuit means for energizing said first and second drive means respectively, first and second movable sensing elements engageable respectively with said first and second members during a portion of the rotational cycles thereof, the time duration of engagement for each rotational cycle of said members being determined by the relative positioning of said elements and said members respectively, said first element being positionable with respect to said first member in accordance with the value of a variable condition, first switch means under the joint control of said first element and said first member for interrupting said transmission circuit to produce a first signal having a time duration in accordance with the time duration of engagement of said first element with said first member, second switch means under the joint control of said second element and said second member for producing a second signal having a time duration in accordance with the time duration of engagement of said second element with said second member, control means responsive to said first and second signals and arranged to position said second element with respect to said second member in such a manner as to maintain the time duration of said second signal substantially equal to the time duration of said first signal, third switch means for periodically breaking said second power circuit means to decrease the rotating speed of said second member to below the speed of said first member, a control lever operatively coupled to said second drive means and arranged to actuate said third switch means once every rotational cycle of said second member, and means responsive to the change in flow of current through said transmission circuit due to operation of said first switch means and arranged to re-connect said second power circuit means to re-establish the normal drive speed for said second member after said first and second members are synchronized in predetermined positions relative to one another.

9. A telemetering system comprising, in combination, a transmitter and a receiver unit, a signal transmission circuit connecting said transmitter and receiver units, means for producing a flow of current through said transmission circuit, first and second rotatable cam-like members for said transmitter and receiver units respectively, first and second drive means for rotating said first and second members with said second member normally rotating at a faster speed than said first member, first and second movable sensing elements operatively associated with said first and second members respectively, said elements each including a pivotally mounted arm one end of which is spring-urged towards contact with the side surface of the corresponding one of said members, said arm being periodically movable by said member as it rotates with respect to said arm, means for positioning the arm of said first element about the pivot mounting thereof in accordance with the value of a variable condition, first electric circuit means operable by the arm of said first element as it is moved by said first member for periodically altering said flow of current to produce in said transmission circuit a first signal having a time duration in accordance with the positioning of said first element with respect to said first member, second electric circuit means under the joint control of said second element and said second member for producing a second signal having a time duration in accordance with the positioning of said second element with respect to said second member, control means responsive to said first and second signals and arranged to position said second element with respect to said second member in such a manner as to maintain the time duration of said second signal substantially equal to the time duration of said first signal, means for periodically decreasing the rotating speed of said second member to below the speed of said first member, and means responsive to the alteration of said flow of current by said first electric circuit means and arranged to re-establish the normal drive speed for said second member after said first and second members are synchronized in predetermined positions relative to one another.

10. A telemetering system comprising, in combination, a transmitter and a receiver unit, a signal transmission circuit connecting said transmitter and receiver units, means for producing a flow of current through said transmission circuit, first and second rotatable cam-like members for said transmitter and receiver units respectively, first and second drive means for rotating said first and second members with said second member normally rotating at a faster speed than said first member, first and second movable sensing elements engageable respectively with said first and second members during a portion of the rotational cycles thereof, each of said elements including a pivotally-mounted first arm having a flexure secured thereto with a second arm mounted on said flexure and urged thereby into contact with the corresponding rotary member, the time duration of engagement between said second arms of said members for each rotational cycle of said members being determined by the relative positioning of said first arms about the pivot mountings thereof, the first arm of said first element being positionable with respect to said first rotatable member in accordance with the value of a variable condition, first electric circuit means under the joint control of said first element and said first member and operable to alter the flow of current through said transmission circuit to produce a first signal having a time duration in accordance with the time duration of duration of engagement of said first element with said first member, second electric circuit means under the joint control of said second element and said second member for producing a second signal having a time duration in accordance with the time duration of engagement of said second element with said second member, control means responsive to said first and second signals and arranged to position said second element with respect to said second member in such a manner as to maintain the time duration of said second signal substantially equal to the time duration of said first signal, means for periodically decreasing the rotating speed of said second member to below the speed of said first member, said last-named means being actuable at the end of a normal rotational cycle of said second rotatable member, and means responsive to the alteration of said curernt flow by said first electric circuit means and arranged to re-establish the normal drive speed for said second member after said first and second members are synchronized in predetermined positions relative to one another.

References Cited in the file of this patent

UNITED STATES PATENTS

| | | |
|---|---|---|
| 1,496,875 | Field | June 10, 1924 |
| 1,822,683 | Wilde | Sept. 8, 1931 |
| 2,059,152 | Smith, Jr. | Oct. 27, 1936 |
| 2,159,413 | Weible | May 23, 1939 |
| 2,188,100 | Frymoyer | Jan. 23, 1940 |
| 2,214,159 | Bristol | Sept. 10, 1940 |
| 2,232,589 | Chappell et al. | Feb. 18, 1941 |
| 2,329,400 | Leone | Sept. 14, 1943 |
| 2,683,514 | Hardway | July 13, 1954 |